United States Patent [19]
Hochuli et al.

[11] 3,860,310
[45] *Jan. 14, 1975

[54] METHOD OF FABRICATING A GAS LASER

[75] Inventors: Urs Hochuli, Hyattsville; Paul R. Haldemann, College Park, both of Md.

[73] Assignee: The University of Maryland, College Park, Md.

[ * ] Notice: The portion of the term of this patent subsequent to Oct. 19, 1988, has been disclaimed.

[22] Filed: Oct. 15, 1971

[21] Appl. No.: 189,527

Related U.S. Application Data

[63] Continuation-in-part of Ser. No. 579,293, Sept. 14, 1966, Pat. No. 3,614,642.

[52] U.S. Cl. .................. 316/26, 316/22, 330/4.3, 331/94.5
[51] Int. Cl. .......................... H01j 9/00, H01s 3/22
[58] Field of Search ............... 316/26, 22; 330/4.3; 331/94.5 G; 313/311

[56] References Cited
UNITED STATES PATENTS

| | | | |
|---|---|---|---|
| 1,908,366 | 5/1933 | Kingsbury | 313/311 |
| 2,467,953 | 4/1949 | Bancroft et al. | 316/26 X |
| 2,591,474 | 4/1952 | Statsman | 316/26 |
| 2,746,831 | 5/1956 | Chapman | 316/26 |
| 3,614,642 | 10/1971 | Hochull et al. | 330/4.3 |

*Primary Examiner*—Roy Lake
*Assistant Examiner*—James W. Davie
*Attorney, Agent, or Firm*—Hyman Hurvitz

[57] ABSTRACT

A cold cathode gas laser, in which the cathode is rendered chemically clean before being oxidized, and in which gas pressure and volume and cathode current density are selected to provide cathode life of far in excess of 10,000 hours for a cathode so prepared, a wide variety of metals being employed.

14 Claims, 9 Drawing Figures

INVENTOR
URS HOCHULI &
PAUL R. HALDEMANN

BY
ATTORNEY

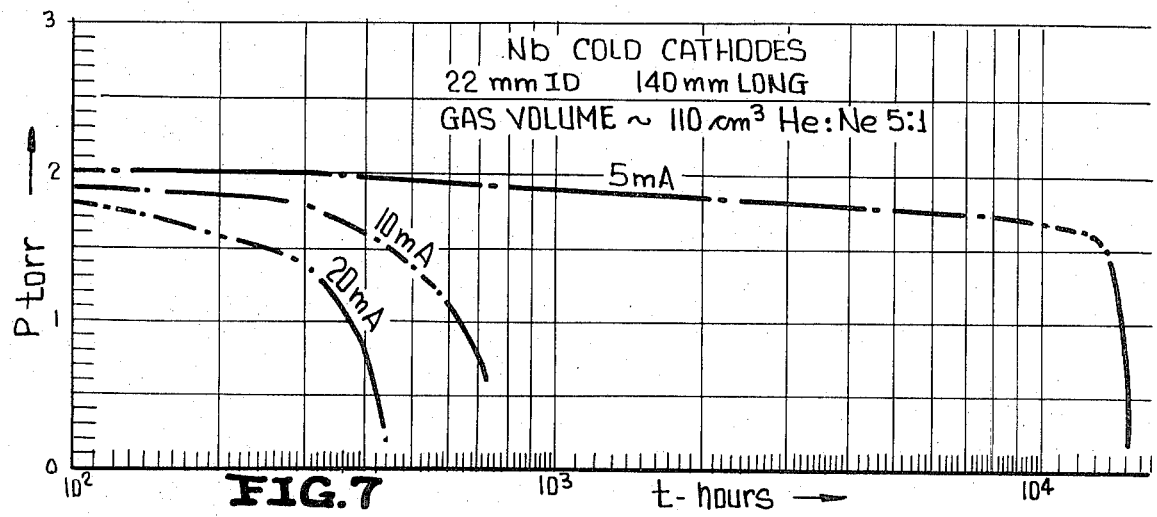
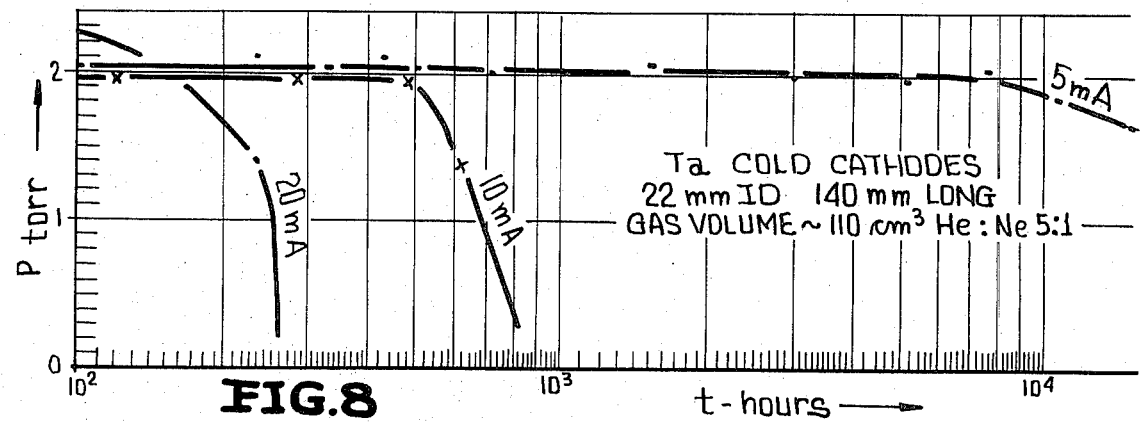
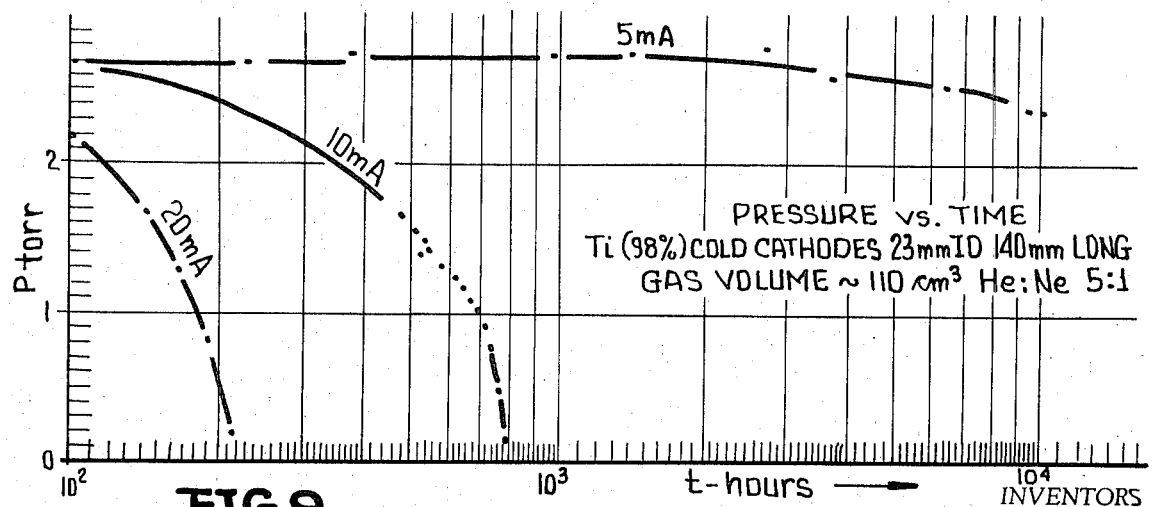

METHOD OF FABRICATING A GAS LASER

CROSS REFERENCE

This application is a continuation-in-part of our copending application Ser. No. 579,293, filed Sept. 14, 1966, entitled "GAS LASER," now U.S. Pat. No. 3,614,642.

BACKGROUND

The present system relates generally to cold cathode gas lasers and to cathodes for gas lasers, and more particularly to methods of operating and fabricating such cathodes and such lasers.

We have found that so long as maximum laser cathode current density is below about 0.5 to 0.6 ma/cm$^2$, for a normal cathode drop, at any and every point of the laser-cathode, long laser life, over 10,000 hours can be attained, if a properly prepared cathode surface is available, employing niobium, aluminum, tantalum, titanium or beryllium, as a base metal. Alloys of these metals are included, since the commercial grades of aluminum used by us are not pure metals. Similarly, long life has been attained for magnesium at about 0.17 mA/cm$^2$, with a gas pressure of 3 Torr. or less and a gas volume of about 50 cm$^3$. Other performance characteristics are available in the drawings, for various metals and current densities.

The single frequency He-Ne gas laser can operate with He-Ne gas mixtures in the ratio range 5 to 1 to 15 to 1 under a total pressure of 3 Torr. or slightly less. With dc excitation the voltage drop across the 1 mm. capillary discharge tube of the laser, 5–7 cm. long, is then approximately 500. – 700. V. for a total current of 5mA. Cold cathodes having a cathode drop of about 100. V. require only half a watt for the emission of 5mA. For cathode diameters of 11.5 mm. and greater and a gas volume of about 50. cm$^3$, a hollow cylindrical aluminum cathode according to the invention provides a life of over 11,000 hours. For a 7.0 mm. diameter life goes down to a few hundred hours, indicating the crucial dependence of life on cathode current density. The latter is the usual and normal life expectancy of laser cathodes, according to prior art for a gas volume of 50 cm$^3$.

Best results have been achieved with aluminum cathodes having an oxide coating. Tests indicate that beryllium and magnesium are effective, the latter not necessarily with a cathode current density of as much as 0.6 mA/cm$^2$ for magnesium.

It is essential that the cathode surface be properly prepared. Chemical treatment of the surface poisons the surface, or, at least, no chemical treatment which has been attempted has failed to do so. Briefly described, according to the invention, the cathode inner surface is machined or its surface layer removed with distilled water as a lubricant, and is then rinsed with distilled water. Acetone can be used to remove grease, if necessary without deleterious effect. Some metals do not require surface cleaning to expose fresh metal, if the surfaces of the metal, when purchased, are already clean.

While the present invention has been successfully tested, as applied only to He-Ne lasers, the principles of the invention are not limited to the gases specified. Still other gas combinations have been used in lasers, and the cathode of the present invention is believed applicable to these if operated at values of cathode current densities no greater than those specified for He-Ne lasers.

Lifetime of a laser is proportional to gas volume, and the specified figure of 50. cm$^3$ is considered about minimum for gas volume from considerations other than lifetime alone, so that the present system enables use of a minimum gas volume and therefore a minimum laser bulk.

It is accordingly a broad object of the invention to provide a cold cathode gas laser having a long lived cathode, which may be specifically at least as long as 10,000 hours.

It is another object of the invention to provide methods of preparing long lived cathode surfaces for cold cathode gas lasers, and of operating such lasers.

It is another object of the invention to provide a novel He-Ne laser capable of operating for over 10,000 hours, which may utilize only about 50. cm$^3$ of gas and which operates at pressures of about 3 Torr.

Another object of the invention resides in the provision of a cathode for a He-Ne laser, having long life at low gas pressures and gas volumes.

It is a further feature of the invention to eliminate plasma oscillations in lasers, since these deteriorate laser operation. In the case of the He-Ne laser these oscillations do not occur if gas pressure is 2.8 Torr or below, a pressure range feasible in accordance with the present invention.

SUMMARY

A method of forming a cold cathode suitable for use in a gas laser tube comprising effecting an electrical discharge between anode and cathode in an oxygen atmosphere.

DRAWINGS

FIG. 7 is a plot of life-time in hours for a cathode of Nb;

FIG. 8 is a plot of life-time in hours for a cathode of Ta; and

FIG. 9 is a plot of life-time in hours for a cathode of Ti.

DESCRIPTION OF THE PREFERRED EMBODIMENT

Figure 1:
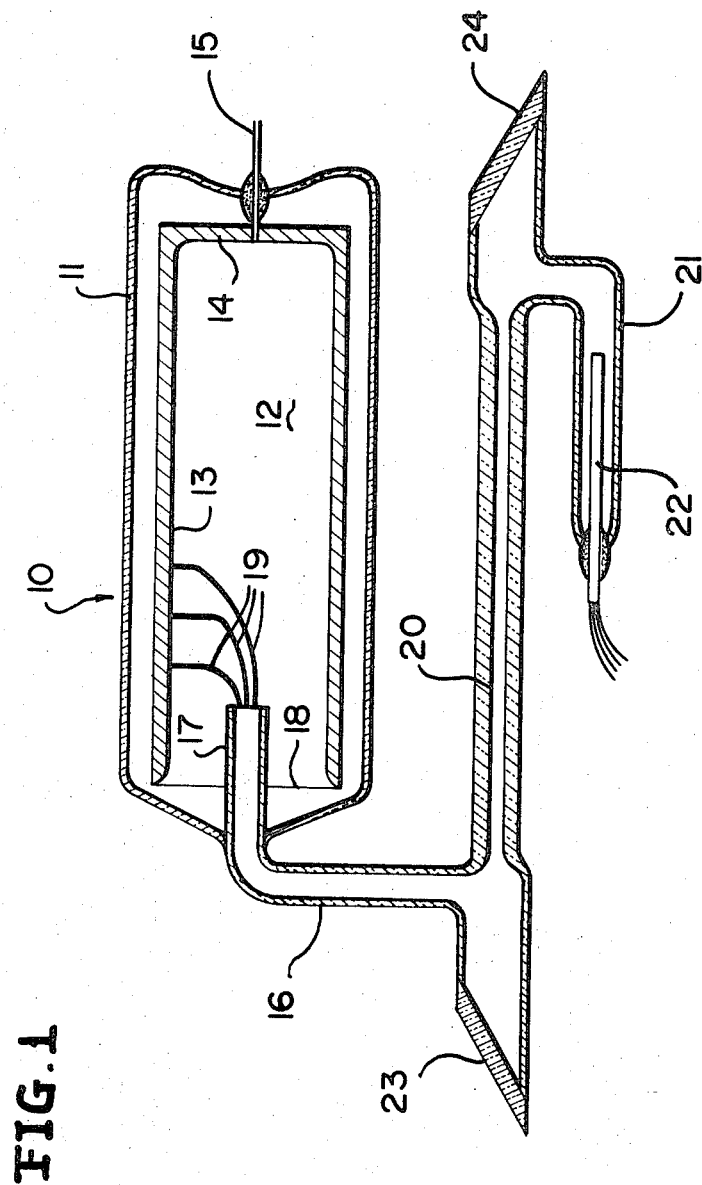
FIG. 1 is a view in front section of a typical gas laser employing the cathode of the invention.
Figure 2:
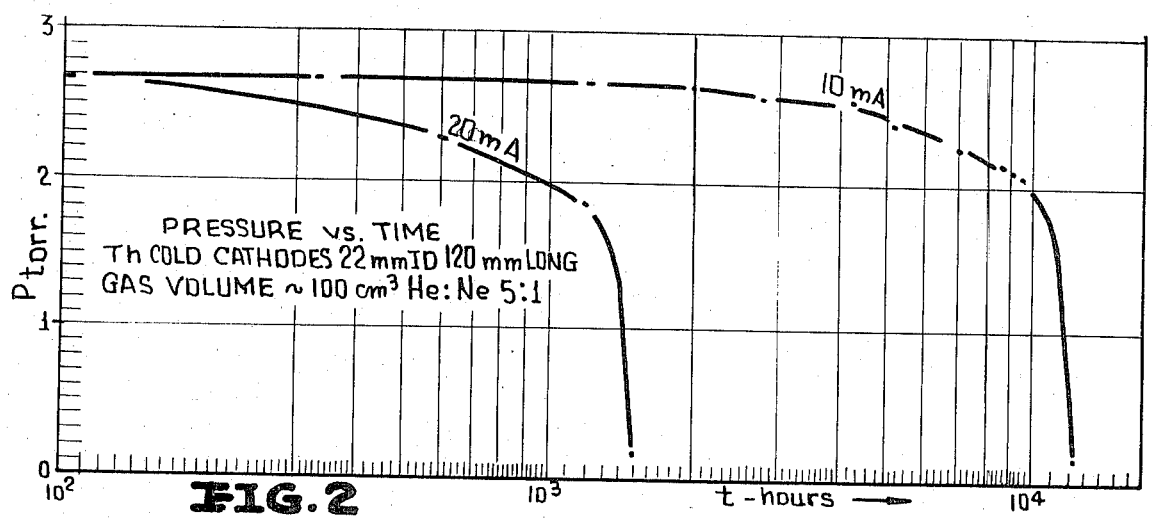
FIG. 2 is a plot of life-time in hours for a cathode of Th.
Figure 3:
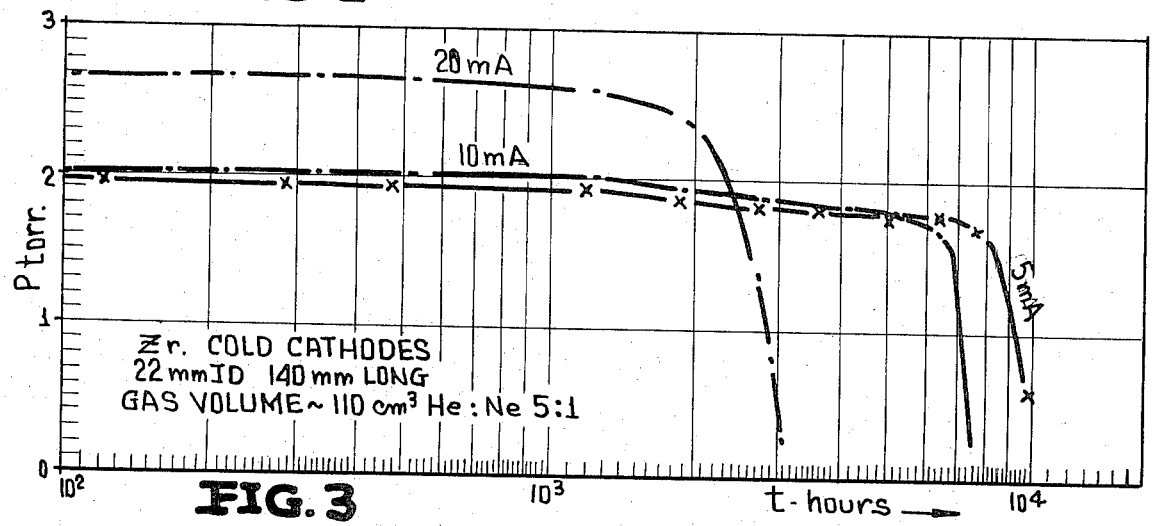
FIG. 3 is a plot of life-time in hours for a cathode of Zr.

Referring now more particularly to FIG. 1 of the drawings, 10 is a quartz or glass envelope, including a cathode section 11. Within cathode section 11 is located a hollow cylindrical cold cathode 12 fabricated of metal having an oxide surface, and selected from among Al, Be, Mg. The inner surface 13 of the cathodic cylinder 12 constitutes the cathodic surface. The cathodic cylinder 12 is closed at one end, by a closure seat 14 and is open at the remaining end. To the closure plate is connected a cathode lead 15 which extends externally of the cathode section 11 via a suitable seal.

A narrow glass tube 16, forming part of the envelope 10, extends from the cathode section 11. An open end 17 of tube 16 extends well within the open end 18 of cathode 12, sufficiently so that when voltage is applied to the tube, the discharge will not derive from or near the edge of the cathode, thereby avoiding high current densities due to edge effects. Typical flow lines are shown at 19.

The tube 16 extends to an interposed capillary section 20, which terminates in an anode section 21l. An anode 22 extends into the latter. A defined light beam path through the capillary section 20 is provided by transparent windows 23, and 24 which are inclined at Brewster's angle to the path of the light beam.

The total gas volume of the enclosure 10 is about 50. cm$^3$, this being essentially near the minimum volume dictated by considerations of cathode life, such as mechanical considerations, desired light path length, required cathode dimensions, and the like. Pressure may be 3 Torr or below. Decrease of pressure reduces life, so that pressures much below 3 Torr are not recommended, but values sufficiently below 3 Torr to assure negligible plasma oscillations can be utilized, i.e., 2.8 Torr.

The volume of the envelope 10 is about 50 cm$^3$. The inner diameter of the cathode 13 is 22 mm., and length is selected to provide a current density of 0.14 mA/cm$^2$. For these conditions a cathode life of well over 10,000 hours was observed.

A detailed method of outgassing the tube with an Al cathode is as follows: The fore pump is used to reduce the air pressure to about 2 Torr. The discharge tubes are then started and the current is adjusted to roughly 5-10 milliamperes per square centimeter active cathode area. This has to be done with a certain amount of care to avoid evaporization of the electrodes. The fore pump is used to keep pressure between 2 and 3 Torr, while the discharge is running. After 1 to 3 minutes, the tubes are turned off, pumped down with the fore pump and then refilled with air or O$_2$ to about 2 Torr, and turned on again.

Repeating this cycle 4 or 5 times leads finally to a stable pressure with the fore pump disconnected. After that the tubes are evacuated down to at least 10$^{-6}$ Torr and further outgassed with a soft flame during this process.

The tubes are then filled with the He-Ne mixture and turned on again with the normal current. As soon as the discharge turns blue the tubes are turned off, pumped down and refilled again. A few such cycles lead to a clean discharge with the characteristic orange He-Ne color. The tubes are then burned in with the normal running current for 1 to 2 days before the final filling and sealing off takes place. These electrodes act as their own getter and no additional getter is used.

An essential feature involved in preparinng the cathode is that it not be chemically treated or contaminated. To this end its inner surface may be machined with distilled water as a lubricant. Acetone may be used to clean the surface, but the surface may not be chemically treated in any way which leaves a chemical residue. Certainly, all of the many such treatments which we have observed have poisoned the cathode, but since possible chemical treatments are infinite, not all could have been tested. The word "machined" is used broadly to connote any process for removing surface metal.

Types of aluminum employed have been Types 1100; 6061; 2011; 7075; 2024. So far as is known any type of easily machinable aluminum, including the specified types, is satisfactory, but not necessarily all with the same current density, which applies to 2024 type aluminum. These metals all oxidize readily in air, forming a very thin tough oxide film, and presence of such an oxide film is essential to success. Possibly chemical poisoning of the cathode surface prevents the formation of the proper oxide layer or renewal of the oxide surface as an existing layer is removed by bombardment during laser operation. The specified current density is presumed to be that which allows replenishment of the oxide layer or the oxide surfaces as rapidly as it is removed by the discharge, or forecloses its destruction by the discharge. Improper chemical treatment of the cathode probably prevents such replenishment or prevents the initial formation of an oxide layer which is not readily removable.

The use of the cathodes above described have led not only to long lived lasers, but have also led to superior laser operation. So long as gas pressure in a He-Ne laser is slightly below 3 Torr, say about 2.8 Torr, plasma oscillations do not occur. These deteriorate laser operation. As pressure is reduced, however, gas clean-up due to sputtering increases, leading to shorter tube life.

It is an important feature of the present invention that it permits construction of a He-Ne laser having a gas volume of as low as about 50. cm$^3$ or less, which is capable of operating with an initial gas pressure of sufficiently less than 3 Torr to eliminate plasma oscillations, and which has a life of over 10,000 hours, provided that no part of the cathode receives greater than a current density of about 0.5 to 0.6 mA/cm$^2$.

It has been found by chemical analysis that type 2024 Al contains the following impurities, by percent:

| | |
|---|---|
| Silicon | .23 |
| Manganese | .58 |
| Chromium | .015 |
| Iron | .29 |
| Titanium | .035 |
| Nickel | Nil |
| Copper | 4.55 |
| Magnesium | 1.78 |
| Zinc | .07 |

It therefore seems clear that purity of metal is not requisite but that commercial grades of metals are suitable.

Cleaning and film forming of beryllium has been successfully accomplished by simple bombardment in oxygen, leading to a cathode life of over 10,000 hours, so that the method of outgassing does not appear to be crucial.

We do not desire to be limited to any theory of operation, our results having been attained empirically.

The term "long life," in respect to a laser, implies that unacceptable gas pressure changes have not occurred.

The total axial length of the cylindrical cathode is equal to the glow length, such that normal cathode drop occurs, i.e., the cathode area is at least as great as the area of the glow for normal drop. To decrease length beyond this point increases cathode drop, which is deleterious, while increase of length beyond this point is useless, but not deleterious.

Figure 4:
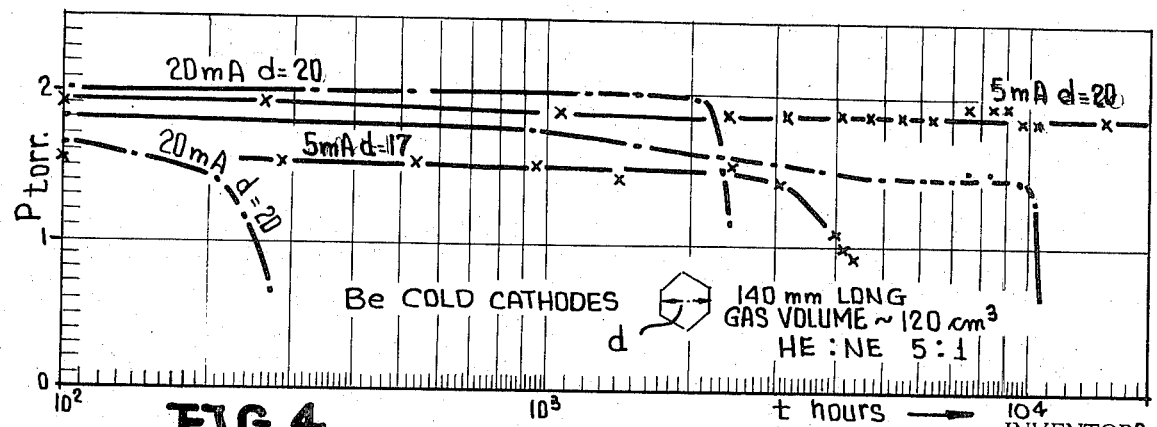
FIG. 4 is a plot of life-time in hours for a cathode of Be.
Figure 5:
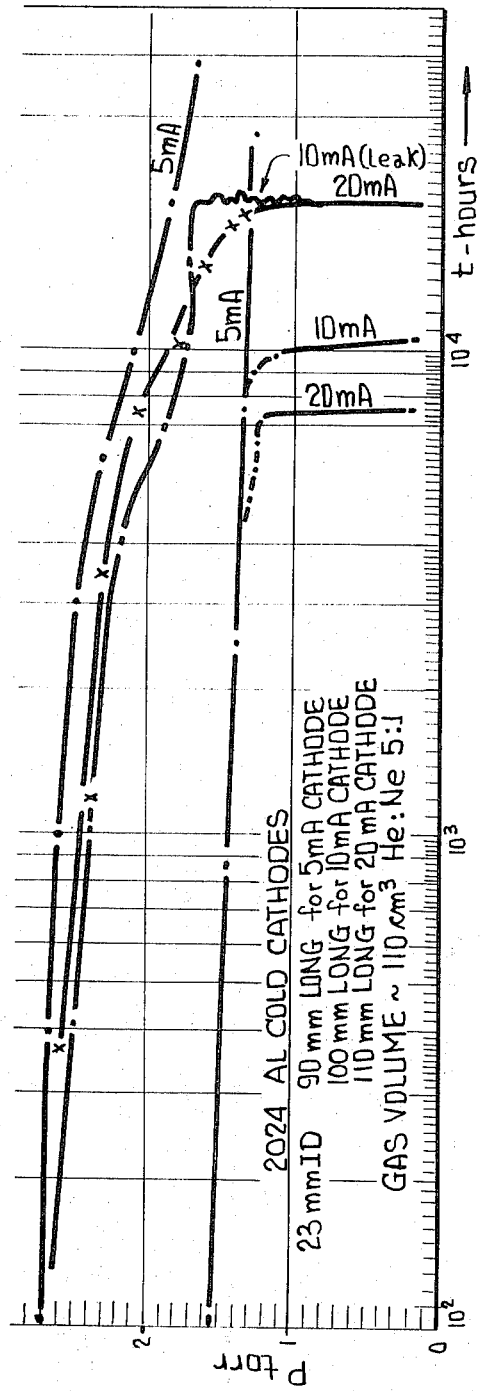
FIG. 5 is a plot of life-time in hours for a cathode of 2024 Al.
Figure 6:
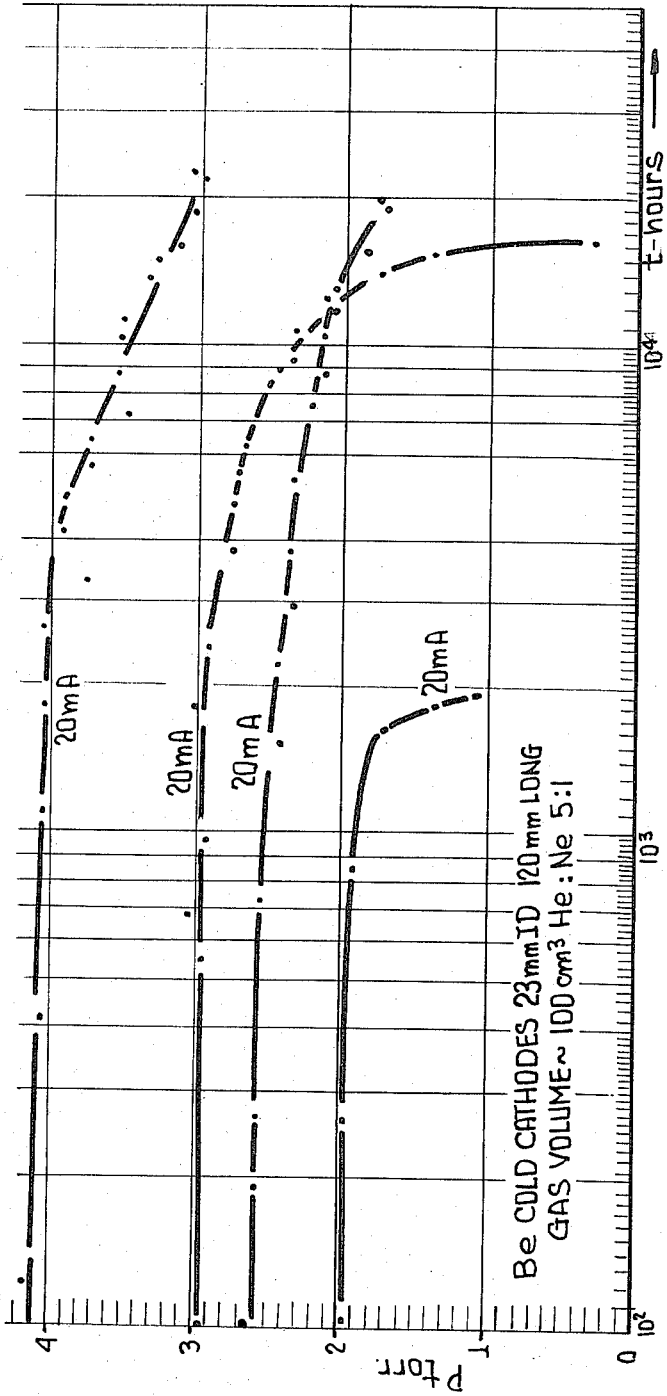
FIG. 6 is a plot of life-time in hours for a cathode of Be.

While aluminum is for many reasons a superior cathode material, many other metals, specifically Nb, Ta, Ti, Be, Th, Zr have been experimentally tested. These have been treated in oxygen as has the aluminum cathode, and in all cases have been found to have long life at about 0.1 to 0.2 ma per cm$^2$ of cathode area, 0.5 to 0.6 ma/cm$^2$ being maximum value for aluminum. Current density as desired is achieved by choosing the proper cathode diameter and length, the letters d in the drawings representing diameter in mm. It is not essential that the cathode be cylindrical, a hexagonal shape being used in FIG. 4. All metals clearly do not have even roughly the same life-times.

As cathode current density increases life-time decreases, for some metals very radically, as is indicated by the experimental tubes of FIGS. 2–9, inclusive. The plots are of pressure vs time, and the currents specified are total cathode current. Failure of a tube is signalled by a radical drop in pressure.

We claim:

1. The method of fabricating a gas laser, said gas laser comprising an extended hollow cylindrical oxide coated cold metallic cathode, an anode and an enclosure for said anode and cathode containing free oxygen, comprising
    preparing the inner surface of said cathode to present an uncontaminated surface, and thereafter respectively, for about four cycles of:
    outpumping said enclosure and filling with O$_2$ to a pressure of about 2 Torr,
    effecting an electrical discharge between said anode and cathode with about 5-10 milliamperes per square centimeter over said inner surface, while maintaining said pressure at about 2-3 Torr,
    terminating discharge and reducing gas pressure in said enclosure well below 2 Torr,
    refilling said enclosure with an oxygen containing gas mixture to about 2 Torr,
    restarting said discharge and again outpumping said discharge,
    thereafter and upon attainment of stable pressure evacuating said envelope to at least 10$^{-6}$ Torr and further outgassing said anode and cathode, and thereafter repetitively filling the enclosure with a laser gas mixture and restarting and continuing the discharge until the laser gas color turns true to type,
    thereafter pumping down to 10$^{-6}$ Torr and refilling with said laser gas, and restarting the discharge, until the discharge becomes and remains the true color representing purity of the laser gas,
    thereafter again initiating a discharge of normally running current resulting in a current density of not more than 0.6 mA/cm$^2$ of cathode area for up to 1 to 2 days, and
    thereafter refilling with the laser gas and sealing.

2. The combination according to claim 1 wherein said laser gas is He-Ne and said true color is orange.

3. The process of preparing a long lived cold cathode surface as an oxide on a metal, in a laser gas tube having said cathode and an anode, comprising removing the surface of said cathode so as to present a chemically uncontaminated metallic cathode area, and effecting an electrical discharge between said uncontaminated cathode area and anode in an atmosphere containing substantial oxygen.

4. The method of fabricating a gas laser cathode, said gas laser comprising an extended hollow cylindrical metallic cold cathode, an anode and an enclosure for said cathode and anode, comprising the steps of removing the inner metallic surface of said cathode so as to present a chemically uncontaminated fresh metallic surface, repetitively forming an electrical discharge between said cathode and anode while maintaining oxygen containing gas at a pressure of about 2-3 Torr in said enclosure with gas outpumping between repetitions until stable gas pressure is achieved, and thereafter outgassing said enclosure to about 10$^{-6}$ Torr and filling said enclosure with a laser gas to operating pressure.

5. The combination according to claim 4 wherein said laser gas is He-Ne.

6. The method of fabricating a gas laser tube having a cold metallic cathode and an anode, comprising so removing metal from a surface of said cathode as to expose a fresh chemically uncontaminated surface of said cathode and forming an oxide on said fresh uncontaminated surface by electrical discharge between said anode and cathode in an oxygen containing atmosphere.

7. The combination according to claim 6, wherein said oxygen containing atmosphere is air.

8. The method of fabricating a cathode of a gas laser tube, said cathode being metallic and operating cold, comprising the steps of so removing metal from a surface of said cathode as to expose a fresh uncontaminated surface of said cathode, and forming an oxide layer on the so exposed surface.

9. The method of fabricating a gas laser tube comprising an extended hollow cylindrical cold cathode, comprising the steps of so machining the inner surface of said cathode as to leave an exposed chemically uncontaminated surface, repetitively forming a gas discharge between said cathode and anode while maintaining oxygen containing gas at a pressure of about 2-3 Torr in said enclosure by gas outpumping between repetitions until stable gas pressure is achieved, and thereafter outgassing said enclosure to about 10$^{-6}$ Torr and filling said enclosure with said laser gas.

10. The combination according to claim 9, wherein said oxygen containing gas is air.

11. The combination according to claim 9, wherein said gas is He-Ne and the filling occurs to about 3 Torr.

12. A method of making a cold cathode laser tube, comprising
    effecting an electrical discharge between said anode and cathodic metal while said anode and cathode are immersed in a gas containing oxygen, and
    at intervals removing gas from said tube and replacing with fresh gas containing oxygen.

13. A method of making a cold cathode laser tube, comprising placing a cold cathode metal and an anode in an enclosure,
    said cathode having a chemically clean surface and said enclosure containing oxygen, and
    effecting an electrical discharge between said anode and cathode, and at intervals outgassing said enclosure and supplying fresh oxygen, until an oxide layer is formed on said metal.

14. A method of forming a cold cathode suitable for use in a gas laser tube having an anode, comprising
    effecting an electrical discharge between said anode and cathode in an atmosphere containing oxygen until an oxide coating is formed on said cold cathode.

* * * * *